(12) United States Patent
Lee et al.

(10) Patent No.: US 9,813,850 B2
(45) Date of Patent: Nov. 7, 2017

(54) ASSET TRACKING SYSTEM HAVING PRIMARY AND SECONDARY TRACKING DEVICES

(71) Applicant: Senaya, Inc., Boston, MA (US)

(72) Inventors: Brian Lee, Boston, MA (US); Jamshed Dubash, Shrewsbury, MA (US); Jahangir Nakra, Titusville, NJ (US); Dadi Setiadi, Edina, MN (US)

(73) Assignee: Senaya, Inc., Framingham, MA (US)

( * ) Notice: Subject to any disclaimer, the term of this patent is extended or adjusted under 35 U.S.C. 154(b) by 157 days.

(21) Appl. No.: 14/248,679

(22) Filed: Apr. 9, 2014

(65) Prior Publication Data

US 2015/0296332 A1   Oct. 15, 2015

(51) Int. Cl.
*H04W 4/02* (2009.01)
*G06K 7/10* (2006.01)
*G06K 19/07* (2006.01)

(52) U.S. Cl.
CPC .......... *H04W 4/02* (2013.01); *G06K 19/0723* (2013.01)

(58) Field of Classification Search
CPC ............................ G06K 19/0723; H04W 4/02
See application file for complete search history.

(56) References Cited

U.S. PATENT DOCUMENTS

| | | | |
|---|---|---|---|
| 6,665,333 B2 * | 12/2003 | McCrady | G01S 5/021 375/141 |
| 7,340,260 B2 | 3/2008 | McAlexander | |
| 7,420,458 B1 | 9/2008 | Kuzma et al. | |
| 7,720,259 B2 | 5/2010 | Gordon et al. | |
| 2002/0118723 A1 * | 8/2002 | McCrady | G01S 5/021 375/130 |
| 2006/0071756 A1 * | 4/2006 | Steeves | G06K 7/10108 340/10.1 |
| 2007/0171047 A1 * | 7/2007 | Goodman | G01S 5/0072 340/539.13 |
| 2012/0253485 A1 * | 10/2012 | Weast | G06F 1/163 700/91 |

(Continued)

OTHER PUBLICATIONS

U.S. Appl. No. 14/038,341, filed Sep. 26, 2013, titled "Pattern Recognition Based Motion Detection for Asset Tracking System," Lee, et al.

(Continued)

*Primary Examiner* — Sisay Yacob
(74) *Attorney, Agent, or Firm* — Holzer Patel Drennan (57) ABSTRACT

An asset tracking system that utilizes a wireless network system and which includes primary (active) and secondary (passive) tracking devices. The primary tracking device acts as a coordinator and the secondary devices surrounding the coordinator act as end-devices. Each secondary device can communicate only with the primary device. The primary device passes messages (data) from the secondary devices to the remote host transparently. Each secondary device only sends its data when it triggered by a 'ping' from the primary device. When a ping event occurs, the primary device broadcasts a main data packet, in some embodiments followed by two additional data packets. Within this time span of the primary data packet, the secondary devices send their data packets to the primary device, in some embodiments, as two small data packets.

19 Claims, 4 Drawing Sheets

(56) References Cited

U.S. PATENT DOCUMENTS

2012/0306438 A1* 12/2012 Howard ................. A42B 3/046
  320/107
2013/0321211 A1 12/2013 Chakraborty et al.
2013/0324151 A1 12/2013 Lee et al.
2013/0324152 A1 12/2013 Lee et al.

OTHER PUBLICATIONS

U.S. Appl. No. 14/140,330, filed Dec. 24, 2013, titled "Methodology to Extend Battery Power in Asset-Tracking Device," Lee, et al.

* cited by examiner

ASSET TRACKING SYSTEM HAVING PRIMARY AND SECONDARY TRACKING DEVICES

FIELD OF THE DISCLOSURE

The present disclosure is directed to wireless asset tracking devices and systems. More particularly, the present disclosure is directed to features configured to extend the battery life of the tracking device.

BACKGROUND

In industry nowadays, success or failure depends in part upon knowing the up-to-date status of various assets. For example, in the freight delivery business, up-to-date knowledge of the location and, in some instances, the environment of various assets, such as pallet goods, is critical to efficient and reliable operations. Failure to maintain up-to-date status information can result in temporarily lost assets, sub-optimal use of the assets, and in the case of freight delivery, missed or late deliveries.

Recently, technologies have been developed that greatly assist in tracking locations of assets. For example, global positioning systems (GPS) use wireless signals transmitted by earth-orbiting satellites to calculate the position of a receiving device. Although relatively expensive, GPS receivers are capable of providing relatively accurate location information for virtually any point in the world.

More recently, radio frequency identification (RF or RFID) systems have been developed in which tracking or transmitting devices, often referred to as "tags," wirelessly communicate with readers. RF tracking systems are typically used in parcel tracking and sorting, container tracking, luggage tracking, retail tracking, warehouse tracking and inventory operations. The tracking devices may be either passive or active. Passive devices absorb signals transmitted by the reader and retransmit their own signals, such as identification information. While a passive device does not require a local power source, its resulting transmit range is relatively short, typically less than 1-2 meters. In contrast, an active device, which sends a signal to indicate its location, includes a local energy source (such as a battery) that improves transmission range. Depending on the wireless signal system used by the device, the range may be on the order of several meters or several hundred meters, or even miles. Regardless of the types of device used, knowledge of the location of the device allows users to identify the location of an asset that has the tracking device attached thereto.

SUMMARY

An asset tracking system that utilizes a wireless network system and which includes primary (active) and secondary (passive) tracking devices or 'tags'. In this combined asset tracking system, some assets being tracked are furnished with a primarily tracking device, and others with a secondary tracking device. With a high aspect ratio deployment between the primary and secondary devices to lower the system cost, a 100% deployment rate can be achieved.

In this system, the primary tracking device acts as a coordinator and the secondary devices surrounding the coordinator act as end-devices. Each secondary device can communicate only with the primary device. The primary device passes messages (data) from the secondary devices to the remote host transparently. Each secondary device only sends its data when it triggered by a 'ping' from the primary device. When a ping event occurs, the primary device broadcasts a main data packet, in some embodiments followed by two additional data packets. Within this time span of the primary data packet, the secondary devices send their data packets to the primary device, in some embodiments, as two small data packets.

This disclosure provides, in one particular embodiment, a wireless RF tracking system that includes a receiver, a primary tracking device and at least one secondary tracking device. The primary tracking device has an RF (e.g., ZigBee/BLE) communication module and a cellular (e.g., CDMA/GSM) communication module for communication with the receiver and with the at least one secondary tracking device. The at least one secondary tracking device has at least one of an RF (e.g., ZigBee/BLE) communication module or a cellular (e.g., CDMA/GSM) communication module for communication with the primary device but not with the receiver. In some embodiments, the primary tracking device has both an RF communication module and a cellular communication module.

This disclosure provides, in another particular embodiment, a wireless RF tracking system that includes a receiver, a primary tracking device and at least one secondary tracking device. The primary tracking device has a RF communication module and a cellular communication module for communication with the receiver and with the at least one secondary tracking device. The at least one secondary tracking device has a RF communication module for communication with the primary device but not with the receiver. The primary tracking device is configured to send a primary data ping to the at least one secondary tracking device. The at least one secondary tracking device is configured to send two secondary data pings to the primary tracking device during the primary data ping.

The secondary tracking device, in some embodiments, is physically smaller and/or lighter than the primary tracking device. In some embodiments, the secondary tracking specifically does not include a cellular communication module.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

Although the tracking system is highly useful, there is a large initial start-up cost associated with these tracking systems; the larger the system, the more tracking devices needed. The present disclosure is directed to a wireless, active, RF tracking system that, to decrease the overall cost of the system, utilizes primary tracking devices and secondary tracking devices to provide the same level of asset tracking and protection but decrease overall system cost.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Also as used herein, when the phrase "at least one of" is used in conjunction with any of "and", "or", and "and/or" what is intended is that the phrase "at least one of X, Y or Z" encompasses, for example: one X; one Y; one Z; one X and one Y; two Xs; etc., unless the context specifically indicates otherwise.

A wireless tracking system is highly beneficial in knowing the physical location of an asset at a set point in time. A "tracking system" and variations thereof includes at least one tracking or transmitter device, and a receiver for receiving the location signal from the tracking transmitter device(s). A "tracking device," "asset-tracking device," "transmitter device," "remote transmitter," and variations thereof, is a signal emitting device configured for placement in or on an asset to be tracked, such as a container of goods.

Assets and products move through different paths and supply chains during the course of their lifetime. There is a need to track these assets and products owing to their value or for business justification purposes. The asset-tracking device therefore becomes critical in solving this problem. The device uses established wireless communication mechanisms to identify its location and convey that information back to the user.

Figure 1:
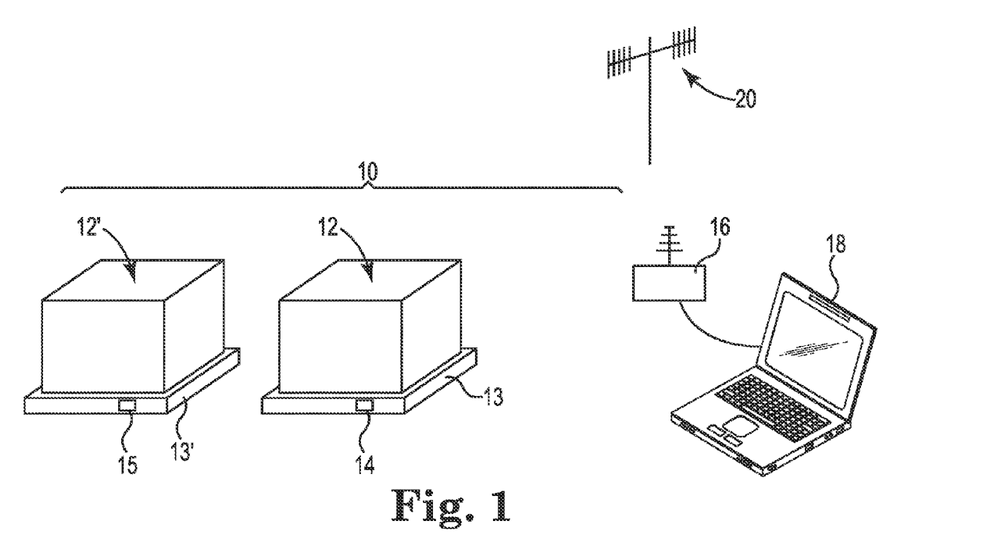
FIG. 1 is a schematic diagram of a wireless asset-tracking system including a tracking device and a receiver.

FIG. 1 illustrates a tracking system according to this disclosure. A "tracking system" and variations thereof includes at least one tracking or transmitter device, and a receiver for receiving the location signal from the tracking transmitter device(s). A "tracking device," "transmitter device," and variations thereof is a portable, signal emitting device configured for placement in or on an asset to be tracked, such as a container of goods, the device including non-volatile memory. FIG. 1 illustrates a tracking system 10 having a primary transmitter device 14 associated with (e.g., located on) an asset 12, in particular, on a pallet 13 on which is a container of goods. Transmitter device 14 is an active RF tag, having the capability to actively transmit and/or provide interactive information to a receiver 16, located remote from asset 12 and transmitter device 14. Tracking system 10 also has a secondary transmitter device 15 associated with (e.g., located on) an asset 12', in particular, on a pallet 13' on which is a container of goods. Transmitter device 15 is an active RF tag, having the capability to actively transmit and/or provide interactive information to primary transmitter device 14.

Receiver 16 is operably connected to a computer, server, or display 18. System 10 uses an established wireless communication network 20 for communication between receiver 16 and primary transmitter device 14, and between primary transmitter device 14 and secondary transmitter device 15. Examples of wireless RF communication networks 20 with which system 10 can function include ZigBee, Bluetooth Low Energy (BLE), WiFi (sometimes referred to as WLAN), and WiMax. In some embodiments, a CDMA/GMS/LTE communication network, which can be considered to be a cellular frequency, may be additional or alternately used.

Figure 2:
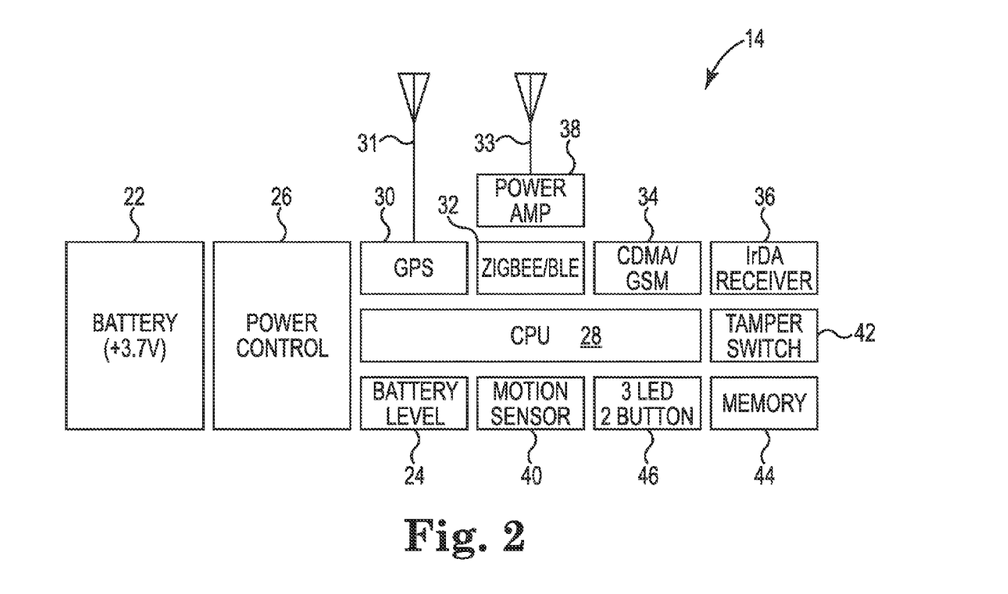
FIG. 2 is a schematic block diagram of a wireless tracking device.
Figure 3:
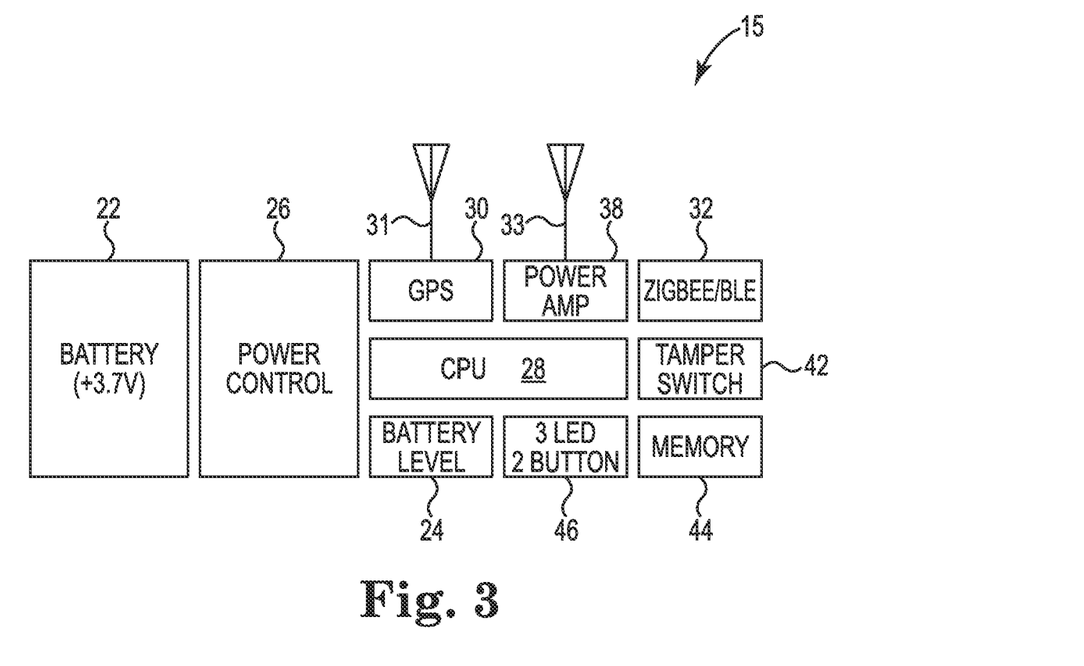
FIG. 3 is a schematic block diagram of another embodiment of a wireless tracking device.
Figure 4:
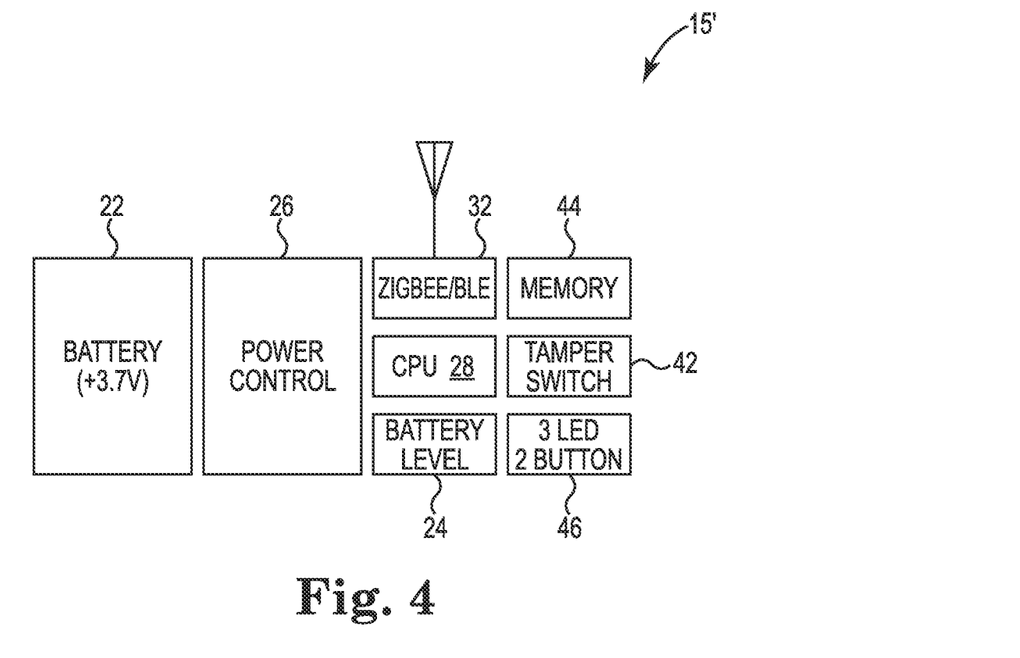
FIG. 4 is a schematic block diagram of yet another embodiment of a wireless tracking device.

A particular embodiment of a primary tracking device (e.g., transmitter device 14 of FIG. 1) is illustrated in FIG. 2, and particular embodiments of secondary tracking devices (e.g., transmitter device 15 of FIG. 1) are illustrated in FIGS. 3 and 4. Tracking device 14 of FIG. 2, together with tracking device 15 of FIG. 5, and a receiver (e.g., receiver 16 of FIG. 1), form a tracking system (e.g., system 10 of FIG. 1). System 10 includes at least one primary tracking device 14 and in most embodiments includes at least 2 primary tracking devices. In some embodiments, the ratio of secondary tracking devices to primary devices in the system is 1:1, however in most embodiments it is greater than 1:1, for example, 5:1, 10:1, 20:1, up to 50:1.

FIG. 2 and the following discussion are directed to one particular wireless tracking device. It is understood that other configurations and designs of the tracking device may be used in conjunction with a secondary tracking device and the system of this disclosure. Tracking device 14 switches between RF and cellular communication networks, depending on availability the communication network.

Primary transmitter or tracking device 14 has a power source, in this particular embodiment a battery 22, operably (electrically) connected to a level monitor 24 and a power control unit 26. Examples of suitable battery 22 include one or more NiCad, lithium, lithium-ion, zinc-carbon, and alkaline batteries. Although a 3.7V battery is shown in FIG. 2, it is understood that other voltage batteries could be used. Example of suitable rechargeable batteries include lead-acid, nickel cadmium (NiCd), nickel metal hydride (NiMH), lithium ion (Li-ion), and lithium ion polymer (Li-ion polymer). The power level (e.g., battery level) monitor 24 and power control unit 26 are operably connected to a computer chip or CPU 28. Present within CPU 28 is appropriate circuitry and programming to implement various power management techniques within device 14. For example, device 14 can be configured to have its data collection or ping event be event-based, time-based, or based on any other protocol.

Tracking device 14 also includes a positioning element, in this embodiment a GPS and/or GLONASS positioning element 30 connected to an antenna 31, which may be an internal antenna or an external antenna, and may be embedded into a housing encasing the elements of device 14. Antenna 31 may be, for example, a planar inverted F antenna, an inverted L antenna, or a monopole antenna. Antenna 31 may be a multi-band antenna, one that can transmit and receive signals in multiple frequency bands. In other embodiments, the positioning element may include mobile station-assisted (MSA) operation to enable accurate positioning at locations where GPS/GLONASS is unavailable or impaired. Positioning element 30 provides data to tracking device 14 regarding its physical location.

Tracking device 14 transmits information or data, such as its location, in the form of a "ping" to the remote receiver (e.g., receiver 16 of FIG. 1) via a wireless network, such as ZigBee and/or WiFi. In some embodiments, tracking device 14 has two-way communication with the receiver. That is, tracking device 14 transmits information (i.e., a ping) and also receives information from the receiver. Further, tracking device 14 may receive instructions, such as to acknowledge that device 14 is active and ready and to transmit the location information. Having received those instructions, device 14 can send back to the receiver acknowledgement that the communication was received and acted on.

As indicated, the tracking device is configured to send and optionally receive data via a wireless network. Device 14 of FIG. 2 is configured with a ZigBee/BLE module 32 to connect to the receiver via a ZigBee network and/or a BLE (Bluetooth low energy) network and communicate data (e.g., position data) to the receiver. An alternate embodiment of a tracking device can utilize a ZigBee/WiFi module and a corresponding ZigBee/WiFi network. Still other embodiments can utilize only a ZigBee module and corresponding network, or only a BLE module and network. Device 14 also includes a cellular communication module 34, which may be CDMA (Code Divisional Multiple Access) and/or GSM (Global System for Mobile Communication) and/or LTE (Long Term Evolution) module, configured to connect to the receiver via either a CDMA or GSM or LTE network and communicate data to the receiver. In most embodiments, modules 32, 34 provide the communication basis for tracking device 14 to and from the receiver. Module 32, which connects device 14 to a wireless RF network, can be utilized when infrastructure is available to use of RF communications, and module 34, which connects device 14 to a cellular network, can be utilized, for example, in situations when infrastructure is unavailable for using RF communications yet do allow cellular communications. In some embodiments, however, tracking device 14 includes a data receiver 36, such as an infrared data link (IrDA), to provide another communication means to device 14, as an alternate or back-up to module 32.

Communication modules 32, 34 may each or together have an antenna 33 which may optionally include a power amplifier 38 to extend the range of the signal from modules 32, 34. In some embodiments, modules 32, 34 may be combined into a single physical module rather than two separate or distinct modules.

Tracking device 14 includes a motion sensor 40 and in some embodiments vision sensor (not shown) to determine the orientation, location and/or movement of device 14. Motion sensor 40 may be a single sensor or an array of sensors. An example of a suitable motion sensor 40 is a 10-degree of freedom (DOF) device that includes a 3-axis gyroscope, 3-axis accelerometer, 3-axis magnetometer, and an altitude sensor. Other embodiments of motion sensor 40 may be used; for example, a three degree of freedom (DOF) device having a 3-axis accelerometer or a six degree of freedom (DOF) device having a 3-axis gyroscope and a 3-axis accelerometer. Another example of s suitable configuration for motion sensor 40 includes a 9-DOF device that includes a 3-axis gyroscope, a 3-axis accelerometer and a 3-axis magnetometer. By sensing the various multiple degrees of freedom, device 14 can distinguish among various movements, orientations and locations, such as lateral motion, acceleration, inclined or declined motion, and altitude.

Any of the data or information regarding device 14, such as its position as determined by positioning element 30, orientation or movement as determined by motion sensor 40, battery level information from monitor 24, etc., can be stored in a memory 44 of device 14, which may be a permanent memory or a rewritable (e.g., nonvolatile) memory.

Device 14 may also include an indicator console 46 having various operational switches, gauges, buttons, and/or lights (e.g., LED lights); in the particular embodiment shown, indicator console 46 has 3 LED lights and 2 buttons. Console 46 may include any number of optional features, such as an audio alarm to indicate any number of problems or malfunctions, such as low battery level, unauthorized movement (as sensed by motion sensor 40), or tampering with device 14 in any manner, as sensed by tamper switch 42.

The various elements of primary transmitter device 14 may be housed in an RF transmissive case, preferably one that is at least water resistant.

As indicated above, device 14 can be configured to have its data collection or ping event be event-based (e.g., a business event) or time-based, or based on any other protocol. Examples of various event-based protocols, identified as SMART Ping™ events, such as described in U.S. Patent Application Publication 2013/0321211 titled "Asset Tracking System with Adjusted Ping Rate and Ping Period," U.S. Patent Application Publication 2013/0324151 titled "Asset Tracking System with Data Ping Based on Asset Movement," U.S. Patent Application Publication 2013/0324152 titled "Asset Tracking System Activated by Predetermined Pattern of Asset Movement," and U.S. patent application Ser. No. 14/038,341 filed Sep. 26, 2013 titled "Pattern Recognition Based Motion Detection for Asset Tracking System," all which are assigned to Petari USA, Inc. and incorporated herein by reference in their entirety, can further be used to optimize power consumption. Another method, which stores multiple data points and sends it once, described in U.S. patent application Ser. No. 14/140,330 filed Dec. 24, 2013 titled "Methodology to Extend Battery Power in Asset-Tracking Device" and also incorporated herein by reference in its entirety, can additionally or alternately be used.

Due to high degree of technicality in transmitter device 14, for some applications, 100% deployment rate of this asset-tracking device is cost prohibitive. In the system of this disclosure (e.g., system 10 of FIG. 1), provides a lower cost system than conventional asset-tracking systems by utilizing two transmitter devices, a primary device such as transmitter device 14 described above, and a secondary transmitter device.

FIG. 3 illustrates secondary transmitter device 15. Similar to primary transmitter device 14 of FIG. 2, secondary device 15 includes battery 22, battery level monitor 24 and power control unit 26 operably connected to CPU 28. Device 15 also includes GPS and/or GLONASS positioning element 30 connected to antenna 31.

Tracking device 15 is configured with ZigBee/BLE module 32 to connect to primary tracking device 14 via a ZigBee and/or a BLE network; an alternate embodiment can utilize only a ZigBee module or only a BLE (Bluetooth) module to connect to primary tracking device 14 via and a corresponding network. Module 32 provides the communication basis for secondary tracking device 14 to and from primary tracking device 15. To simplify secondary tracking device 15 in relation to primary tracking device 14, and thus typically decrease its cost, secondary device 15 does not include a cellular communication module nor a back-up infrared data link. Communication module 32 can have antenna 33 and power amplifier 38 to extend the range of the signal from module 32.

Any of the data or information regarding device 15, such as its position as determined by positioning element 30, battery level information from monitor 24, any tampering information from switch 42, etc., can be stored in memory 44 of device 15, which may be a permanent memory or a rewritable (e.g., nonvolatile) memory. Device 15 may also include indicator console 46, which, in the particular embodiment shown, has 3 LED lights and 2 buttons. The various elements of secondary transmitter device 15 may be housed in an RF transmissive case, preferably one that is at least water resistant.

As seen in FIG. 3 and described above, secondary device 15 includes ZigBee/BLE communication module 32 but does not include a cellular communication module (e.g., CDMA/GSM module) nor a back-up infrared data link. Device 15 also does not include a motion sensor. By eliminating these elements, the secondary device is typically smaller in physical size and also costs less than primary device 14.

Another embodiment of a secondary tracking device is shown in FIG. 4 as device 15'. Similar to device 15 of FIG. 3, device 15' of FIG. 4 does not include a cellular communication module (e.g., CDMA/GSM module), a back-up infrared data link, nor a motion sensor. Device 15' also does not include a GPS positioning element or a power amplifier, further allowing the secondary device to be smaller and cost less than primary device 14.

In some embodiments, secondary device 15, 15' has two-way communication with primary device 14. That is, secondary device 15, 15' transmits information and also receives information from primary device 14. Secondary device 15, 15' transmits information, such as location through primary device 14. Further, secondary device 15, 15' receives instructions, such as to acknowledge that device 15, 15' is active and ready to transmit the location information. Having received those instructions, secondary device 15, 15' can send back to primary device 14 an acknowledgement that the communication was received and acted on.

For embodiments where primary and secondary devices 14, 15, 15' use BLE modules to communicate to each other via a BLE network, both devices 14 and 15, 15' use a proximity profile. In this proximity profile, primary device 14 acts as a proximity monitor and secondary device 15, 15' acts as a proximity reporter, except that secondary device 15, 15' is configured and set in a 'connectable mode', rather than a solely passive mode. Secondary device 15, 15' could additionally or alternately be discoverable and advertise, as described below. In these configurations, primary device 14 performs the connection procedures as defined by generic attribute profile to establish a connection with secondary devices 15, 15'.

Figure 5:
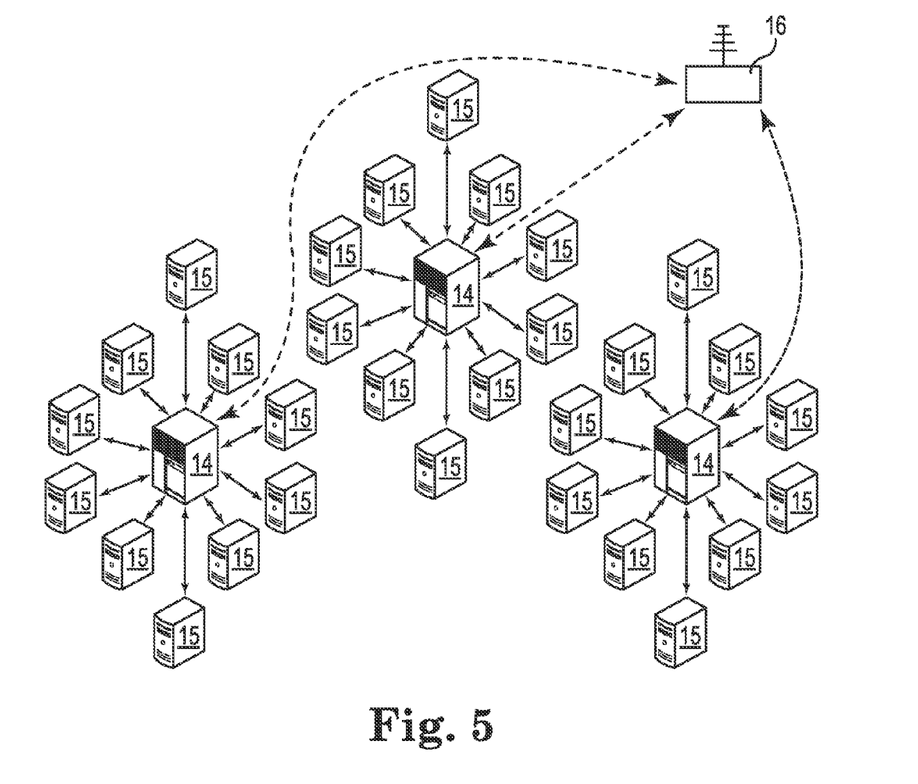
FIG. 5 is a schematic diagram of a wireless tracking system.

The asset tracking system of this disclosure adopts a star network topology as shown in FIG. 5. In this network topology, primary device 14 acts as a coordinator, and at least one secondary device 15 surrounding the coordinator acts as an end-device. One primary device 14 may have 1, 2, 5, 10, 15, and even up to 50 or more secondary devices 15 associated with it. In some embodiments, 50 secondary devices 15 can be associated with a single primary device 14. Each secondary device 15 can communicate only with primary device 14, and not with remote host or receiver 16. Primary device 14 passes messages (data) from secondary device 15 to the remote receiver 16 transparently. Secondary device 15 broadcasts only at a ping event in response to instructions received from primary device 14. In some embodiments, primary device 14 has a multi channel capability to maximize connectivity with multiple secondary devices 15. A channel can be assigned in each secondary device 15 by an artificial intelligence (AI) system or in a random manner.

When secondary device 15 is not paired with primary device 14 or a first connection is not established yet between primary device 14 and secondary device 15, the secondary device advertises its presence using a fast connection for a predetermined initial period, such as the first 30 seconds. If a connection is not established within that initial time period, secondary device 15 then advertises itself, in some embodiments, in a reduced power consumption mode. The advertising interval and time period is determined with consideration of user expected connection establishment time. Secondary device 15 will accept any valid values for connection interval and connection latency set by primary device 14. Only after that period does secondary device 15 change to the preferred connection parameters that best suits its use case. If a connection is not established within a time limit defined by secondary device 15, secondary device 15 exits the connectable mode. If a connection is terminated due to link loss, secondary device 15 attempts to reconnect to primary device 14 by entering a connectable mode.

Additionally or alternately, primary device 14 uses a connection establishment procedure to initiate a connection to secondary device 15 when commanded by the user. The scan interval and scan window are configured with consideration for user expectations of the connection establishment time. For an initial period, e.g., the first 30 seconds, (or optionally continuously for main powered devices), primary device 14 uses the first scan window/scan interval pair to attempt a fast connection. However, if a connection is not established within that initial time period, primary device 14 switches to one of the other scan window/scan interval options to reduce power consumption. Primary device 14 uses a scan window and scan interval suitable to its power and connection time requirements. For example, increasing the scan window period increases the power consumption, but decreases the connection time.

Primary device 14 starts encryption after each connection creation to verify the status of the connection or bond. If encryption fails upon connection establishment (i.e., the pair no longer exists), primary device 14 performs a service discovery. When a connection is terminated due to link loss, primary device 14 attempts to reconnect to secondary device 15 using any available connection procedures.

After a connection has been established and verified, the ping or instruction from primary device 14 to secondary device 15 can be a time-based ping, for example, sent continuously throughout the whole year, or, the ping or instruction can be an event-based ping, being sent by primary device 14 when a business-event or other event of importance is identified.

Figure 6:
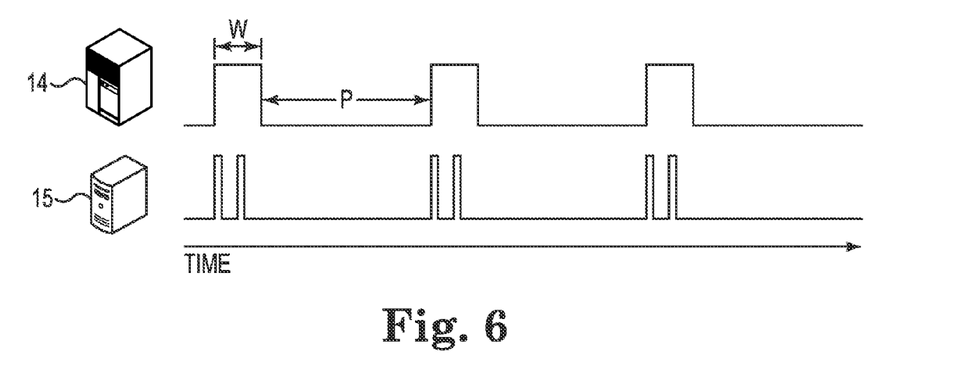
FIG. 6 is a schematic diagram illustrating sending data packets from multiple wireless tracking devices.

To reduce the probability of data collision, data transmission from primary device 14 and secondary device 15 have different data transmission packets; that, at least one of the pulse width "W" or the period between subsequent pulses "P" for secondary device 15 is different than that of primary device 14. FIG. 6 illustrates an example of different data transmission packets for primary device 14 and secondary device 15. The data transmission packet for primary device 14 is composed of a pulse having a width "W", with subsequent pulses having a period "P" therebetween. In this embodiment, primary device 14 sends two additional packets, thus sending three packets, for each data transmission event. In other words, primary device 14 sends three data packets (pulses) for each data event or ping. As an example, a pulse width "W" is 1 second, and the time span "P" between pulses is 100 seconds.

In the embodiment of FIG. 6, secondary device 15 responds with two shorter pulses for each data packet (pulse) from primary device 14. Therefore, secondary device 15 will broadcast six pulses for every data transmission event. As an example, for a primary data transmission packet having a pulse width "W" of 1 second, and a time span "P" of 100 seconds, secondary device 15 has a pulse width "W" of 10 milliseconds and a time span "P" between two pulses of 500 milliseconds.

Appropriate circuitry and programming, such as on an asset intelligence (AI) server, predetermines duration of this pulse and a time span between two pulses for all primary and secondary devices in a system. The time duration "P" of the pulse of a data packet and the timing of the pulse are controlled by the AI to avoid overlaps between pings from primary devices and secondary devices, and also from multiple primary devices in a system.

If primary device 14 does not detect a response or ping from secondary device 15 for an extended period of time (i.e., >5T, where T is a predetermined time period, e.g., 1 minute, 10 minutes, 1 hour, etc.), primary device 14 automatically turns off its receiving operation until a next ping event (e.g., business event) occurs; this may be done to save power in device 14.

The maximum number of secondary devices 15 suitable for a single primary device 14 is based on the number of communication channels, the response speed of primary device 14, and also the response speed of each secondary device 15. For example, if primary device 14 can handle communication with each secondary device 15 within a preset period (e.g., 10 milliseconds) for each channel and each secondary device 15 can send two pulses within each pulse of the primary device, the maximum number of secondary devices 15 handled by primary device 14 is 50. If primary device 14 is configured to utilize multiple channels to alleviate data collision, the maximum number of secondary devices 15 handled can be increased by a factor of 10 for each additional channel, usually up to 12 channels.

Figure 7:
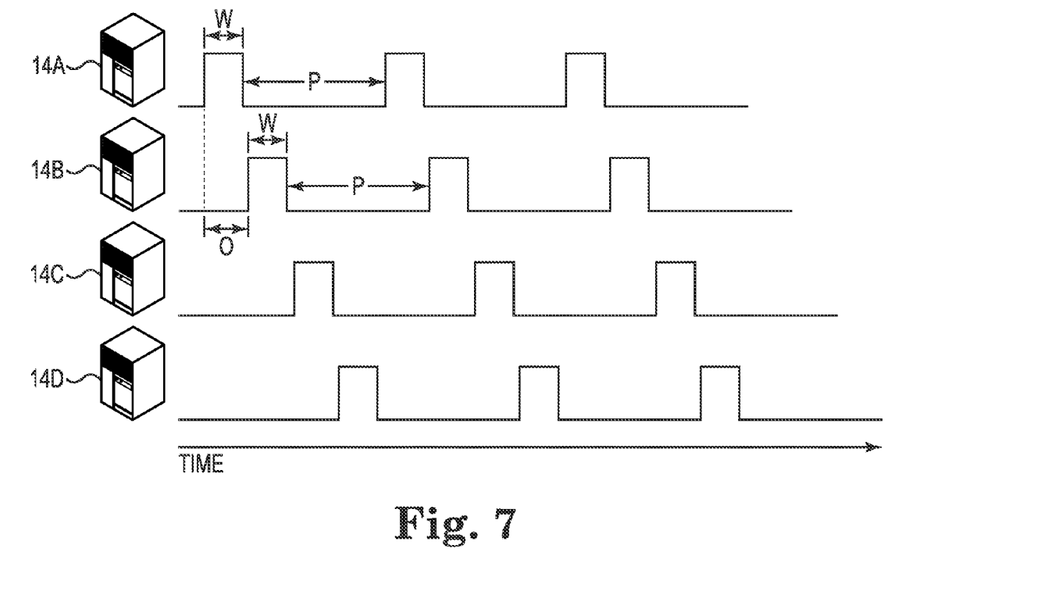
FIG. 7 is a schematic diagram illustrating another embodiment of sending of data packets from multiple wireless tracking devices.

FIG. 7 illustrates an example where transmission of the data packages from four primary devices 14A, 14B, 14C, 14D in a system are offset in time; by having the data packages offset, the same RF transmission channel can be used for each device 14A, 14B, 14C, 14D. These transmissions may be either data pings to secondary devices 15 (see FIG. 5) or to receiver 16 (see FIG. 5). The AI controls the timing of the transmission of the data packets by offsetting the transmissions. In such a configuration, receiver 16 (FIG. 5) is still able to detect these pings because there is no overlap between pulses.

As an example, primary device 14A sends a time-based ping (e.g., each pulse having a width "W" of 1 second) once every 10 minutes. Second primary device 14B sends a similar time-based ping (e.g., each pulse having a width "W" of 1 second) an offset "O" time period after the ping from device 14A has initiated. Similarly, third primary device 14C sends a time-based ping after offset "O" time period after the ping from device 14B has initiated. And again, fourth primary device 14D sends a time-based ping offset "O" time period after the ping from device 14C has initiated. In a variation, second primary device 14B sends a time-based ping after the ping from device 14A has ended. Similarly, third primary device 14C sends a time-based ping after the ping from device 14B has ended. And again, fourth primary device 14D sends a time-based ping after the ping from device 14D has ended.

For embodiments where the data transmission packets are event-based, the same methodology applies. A device will not send its ping until either the predetermined offset period "O" has passed since the previous ping initiated or until the previous ping has completed.

In the previous discussion of FIG. 7, it is assumed that primary devices 14A, 14B, 14C, 14D operated on the same frequency channel, and thus offsetting the data pulses inhibits its data collision. Primary devices 14A, 14B, 14C, 14D may additionally or alternately be on different frequencies.

Figure 8:
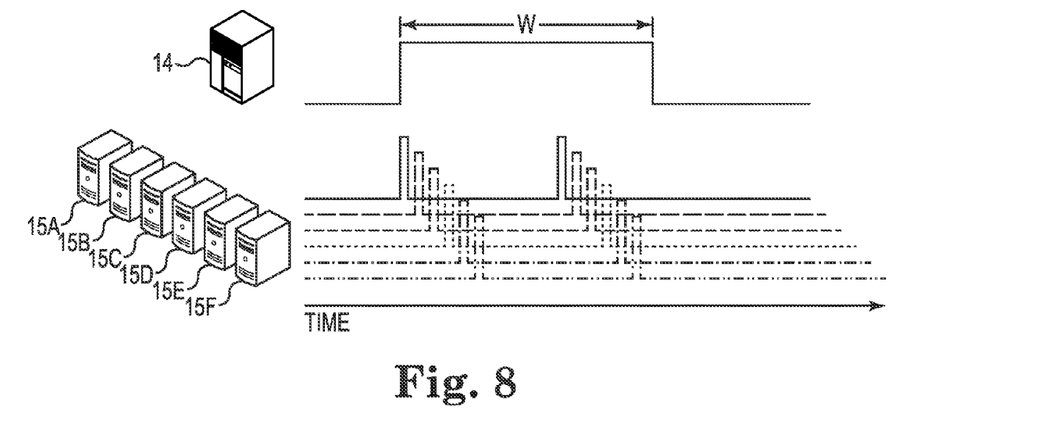
FIG. 8 is a schematic diagram illustrating yet another embodiment of sending of data packets from multiple wireless tracking devices.

FIG. 8 illustrates an example time diagram of the communication between a single primary device 14 and multiple secondary devices 15A, 15B, 15C, 15D, 15E, 15F. In this example, the duration "W" of the pulse of primary device 14 is 1 second, and the duration of the pulse of secondary devices 15A, 15B, 15C, 15D, 15E, 15F is 10 milliseconds. Within the 1 second primary pulse duration, each secondary devices sends two pulses of 10 milliseconds each, with a 50 millisecond time span between these pulses. The pulses of each secondary device are offset from each other, to avoid data collision.

Table 1, below, illustrates an example of yearly power consumption of one primary device and one secondary device for a ZigBee-network-based communication system. In this example, it was assumed that each communication between the primary and secondary device was completed within 10 milliseconds. The primary device consumes 30 mA when in its listening mode, and the primarily device can handle up to 12 multiple frequency channels. It was also assumed that within one year, only 1000 ping events occurred. The Table shows that the primary device consumes 438 mAh and the secondary device consumes 222 mAh.

TABLE 1

| | active current (mA) | pulse width (sec) | period (sec) | duty factor (%) | yearly power consumption (mAh) | remarks |
|---|---|---|---|---|---|---|
| primary device | 30 | 1 | 600 | 0.2% | 438 | Main device receives signals only from secondary device |
| secondary device | 200 | 0.01 | 0.5 | 2.0% | 222 | Two attempts per ping; 1,000 pings/year |

As another example, for a 100% deployment of an asset tracking system of this disclosure, a site has a 1% chance of containing a primary device and 99% chance of having a secondary device. The probability of finding no (0 or zero) primary devices within 400 pallets using smart tag asset tracking system is $$f(x) = \binom{n}{x} p^x (1-p)^{n-x}$$
$$= (0.01)^0 (1-0.01)^{400-0} \sim 0.018 \text{(or } 1.8\%)$$

where n=the number of pallets, x=the number of primary devices, p=0.01 (1% chance of a site containing the primary device).

Table 2 illustrates the distribution probability of finding a primary device in a site using an asset tracking system of this disclosure with 400 pallets. The "X" is a binomial random variable from 1 to 4, "P" is the chance of a site containing a primary device (i.e., between 1% to 5%).

TABLE 2

|  | P = 1% | P = 2% | P = 3% | P = 4% | P = 5% |
| --- | --- | --- | --- | --- | --- |
| X = 0 | 1.8% | 0.03% | 5.1e$^{-4}$% | 8.1e$^{-6}$% | 1.2e$^{-7}$% |
| X = 1 | 7.3% | 0.25% | 0.0063% | 1.4e$^{-4}$% | 2.6e$^{-6}$% |
| X = 2 | 14.60% | 1.03% | 0.04% | 0.00% | 2.7e$^{-5}$% |
| X = 3 | 19.60% | 2.78% | 0.16% | 0.01% | 1.9e$^{-4}$% |
| X = 4 | 19.60% | 5.60% | 0.49% | 0.03% | 9.9e$^{-4}$% |

As a summary, this disclosure provides a RF tracking system that includes at least one primary tracking device that acts as a coordinator to at least one secondary device, and typically to at least multiple secondary devices, that surround the coordinator and act as end-devices. Each secondary device can communicate only with the primary device. It is the primary device that passes messages (data) from the secondary devices to the remote host or receiver. Each secondary device only sends its data packet when it triggered by a 'ping' from the primary device. When a ping event occurs, the primary device broadcasts a main data packet, in some embodiments followed by two additional data packets. Within this time span of the primary data packet, the secondary device sends its data packet to the primary device, in some embodiments, as two small data packets.

Thus, various embodiments of the ASSET TRACKING SYSTEM HAVING PRIMARY AND SECONDARY TRACKING DEVICES are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A wireless RF tracking system comprising:
   a receiver;
   a primary tracking device; and
   at least one secondary tracking device;
   the primary tracking device having a ZigBee and BLE communication module for short-range communication with the at least one secondary tracking device, a cellular communication module for long-range communication with the receiver, a GPS or GLONASS positioning element, and a first battery;
   the at least one secondary tracking device having a ZigBee and BLE communication module for short-range communication with the primary tracking device but not with the receiver, no cellular communication module, a second battery, and no positioning element;
   wherein power consumption of the primary tracking device is more than power consumption of the secondary tracking device.

2. The wireless RF tracking system of claim 1, wherein:
   the primary tracking device is configured to send a ping signal having a pulse width to the at least one secondary device; and
   the at least one secondary tracking device is configured to send a data package to the primary tracking device during the pulse width of the ping signal.

3. The wireless RF tracking system of claim 2, wherein the at least one secondary tracking device is configured to send two data packages to the primary tracking device during the pulse width of the ping signal.

4. The wireless RF tracking system of claim 2, wherein the pulse width of the ping signal is 1 second and a pulse width of the data package is 10 milliseconds.

5. The wireless RF tracking system of claim 1 comprising a plurality of primary tracking devices, with each of the plurality of primary tracking devices configured to send a ping signal with a pulse width offset in time.

6. The wireless RF tracking system of claim 1 comprising a plurality of primary tracking device and 50 secondary tracking devices for each of the plurality of primary tracking devices.

7. The wireless RF tracking system of claim 1, wherein the primary tracking device comprises an IR data link and the secondary tracking device does not comprise an IR data link.

8. The wireless RF tracking system of claim 1, wherein the secondary tracking device does not comprise a cellular communication module.

9. The wireless RF tracking system of claim 1, wherein the cellular communication module of the primary tacking device is at least one of CDMA, GSM or LTE.

10. A wireless RF tracking system comprising:
    a receiver;
    a primary tracking device having a positioning element, a RF communication module for communication with at least one secondary tracking device and a cellular communication module for communication with the receiver, a first battery and a GPS or GLONASS positioning element, the primary tracking device configured to send a primary data ping to the at least one secondary tracking device based on an event-based protocol or a time-based protocol;
    the at least one secondary tracking device having a RF communication module for communication with the primary device but not with the receiver, no cellular communication transmitter, a second battery and no positioning element, with the at least one secondary tracking device configured to send two secondary data pings to the primary tracking device during the primary data ping.

11. The wireless RF tracking system of claim 10 comprising a plurality of primary tracking devices, with each of the plurality of primary tracking devices configured to communicate on a different RF frequency channel.

12. The wireless RF tracking system of claim 10, wherein the primary data ping has a pulse width of about 1 second.

13. The wireless RF tracking system of claim 10, wherein the two secondary data pings have a pulse width of about 10 milliseconds.

14. The wireless RF tracking system of claim 10, wherein the primary tracking device sends the primary data ping to the at least one secondary tracking device via cellular.

15. The wireless RF tracking system of claim 10, wherein the primary tracking device sends the primary data ping to the at least one secondary tracking device via RF.

16. The wireless RF tracking system of claim 10, comprising a plurality of primary tracking devices, with each of the plurality of primary tracking devices configured to send a ping signal with a pulse width offset in time.

17. The wireless RF tracking system of claim 10, comprising a plurality of primary tracking device and 50 secondary tracking devices for each of the plurality of primary tracking devices.

18. The wireless RF tracking system of claim 10, wherein power consumption of the primary tracking device is more than power consumption of the secondary tracking device.

19. The wireless tracking system of claim 10,
the primary tracking device having the cellular communication module for communication with the at least one secondary tracking device; and
the at least one tracking device having a cellular communication receiver.

\* \* \* \* \*